United States Patent Office 3,306,931
Patented Feb. 28, 1967

3,306,931
PRODUCTION OF ALKALI METAL
ALKYL SULFONATES
Robert T. Adams, Lafayette, and Elmer E. Johnson and John M. Salmela, San Rafael, Calif., assignors to Chevron Research Company, a corporation of Delaware
No Drawing. Filed Feb. 17, 1965, Ser. No. 433,485
5 Claims. (Cl. 260—513)

This application is a continuation-in-part of application Serial No. 124,326, filed July 17, 1961, and now abandoned.

The present invention relates to the preparation of alkali metal alkyl sulfonates, useful as detergents, by the addition of an alkali metal bisulfites to terminal olefinic double bonds. More particularly, the invention provides an improved process for alkali metal bisulfite addition to primary olefins by means of a fast, continuous, one-phase air-initiated reaction system.

Bisulfite addition reactions have been used successfully for the production of various alkyl sulfonates from olefins. Air or other oxygen-containing gases, as well as peroxidic substances, have commonly been employed to initiate the reaction. However, it has been found that when any of the air-initiated processes of the prior art are employed to produce an alkali metal alkyl sulfonate from primary olefins, particularly those of higher molecular weight, and an alkali metal bisulfite, the reaction has been extremely slow, thus requiring unusually long time periods to obtain adequate yields. For example, the process of U.S. Patent 2,653,970 requires from about 16–40 hours to obtain reasonable yields of sodium alkyl sulfonate. Other known air-initiated processes require times of a similar order to magnitude.

It has now been found that a high molecular weight alkali metal sulfonate can be produced continuously in substantially quantitative yields at an average residence time of less than 4 hours by an air-initiated addition reaction of bisulfite ion to primary olefins of 10 to 20 carbon atoms. This is accomplished by correlating the conditions of reaction, involving proportions of reactants, type and proportions of solvent medium, temperature and pH, to produce a one-phase reaction system.

More particularly, in accordance with the invention, there is provided a process for preparing alkali metal sulfonates from $C_{10}$–$C_{20}$ olefins, which comprises continuously passing into the reaction zone as feed, said olefins, aqueous alkali metal bisulfite, and, as solvent, a solution of 2-propanol and water. The various components of the feed are fed into the reaction zone at rates adapted to maintain in the feed a bisulfite to olefin mol ratio of at least about 4:5, preferably above about 6:5 and below about 2:1, the weight ratio of the 2-propanol-water solvent to olefin between about 4:1 to 5:3, preferably 3:1 to 2:1, the weight ratio of 2-propanol to water being in about the range 1:4 to 9:4, preferably 1:2 to 2:1. During reaction, the temperature is maintained between about 80°–200° F., preferably 90°–130° F.; an oxygen-containing gas, such as pure oxygen or air, is continuously passed through the reaction mixture to serve as initiator; and the pH is adjusted, as by the addition of sodium hydroxide, to within about the range pH 5 to pH 8.

The reaction mixture, including said feed and alkali metal alkyl sulfonate product, is thoroughly admixed so that there is present during reaction a homogeneous system.

Suitable apparatus for providing the thorough mixing required is a continuous flow-stirred tank reactor. In this apparatus, complete back-mixing occurs; as a result, the liquid contained therein has the same composition throughout. Product withdrawn, or overflow, has the same composition as the contents of the reactor, only the feed to the reactor being different in composition.

The reaction mixture containing alkali metal alkyl sulfonate is continuously withdrawn, and further purified if desired.

In place of preformed alkali metal bisulfite, alkali metal bisulfite can be formed in situ during the course of reaction by the interaction of sulfur dioxide and a base, such as sodium hydroxide or potassium hydroxide.

Therefore, in accordance with this embodiment of the invention, feed comprising $C_{10}$–$C_{20}$ terminal olefins, alkali metal hydroxide solution, such as sodium or potassium hydroxide solution, and 2-propanol-water solvent is continuously fed into the reaction zone. In the feed, the weight ratio of 2-propanol to water is within about the range 1:4 to 9:4, preferably 1:2 to 2:1; and the weight ratio of the 2-propanol-water solvent to olefin within about the range 4:1 to 5:3, preferably 3:1 to 2:1. Sulfur dioxide is continuously added such as to maintain a pH in about the range 5 to 8. Air is also passed continuously through the aforesaid components, and initimate admixing is provided to produce a single-phase homogeneous system of constant composition. Temperature of reaction is maintained within about the range 80°–200° F., preferably 90°–130° F. Product is continuously withdrawn from the reaction zone.

The olefinic materials used in the preparation of the sulfonated products by the novel process of the invention can be any of a broad class of terminally unsaturated compounds. Preferred feedstocks are primary olefins having between about 10–20 carbon atoms in the molecule from which primary sodium alkyl sulfonates may be prepared. However, the olefin feed may also contain small amounts of other types of olefins, e.g., olefins with an internal double bond.

Where crude olefinic materials are employed as starting material, it has been found desirable to pretreat these olefins to remove some of their undesirable impurities and/or inhibitors prior to the bisulfite additon. This may be effected by passing the olefin feed through an adsorbent material, such as silica gel, at about 1–5 volume percent of olefin feed. The pretreatment may also be accomplished by a mild acid treatment wherein the olefins to be sulfonated are contacted with about 0.5–5.0 volume percent of at least 70 percent by weight $M_2SO_4$ for a short period of time, the variables being chosen to minimize isomerization, particularly isomerization to internal olefins, while recovering a product which has a large proportion of the impurities removed. After acid treatment, the sludge from the acid contact is separated from the olefins by a phase separation. The olefins are washed and distilled to obtain a distillate of purified terminal olefins. The foregoing pretreating processes serve to render the final sulfonated product more suitable for detergent manufacture.

In carrying out the invention, a fully continuous process is employed. By carefully controlling the rate of addition of alkali metal bisulfiite, olefin, and solvent, as aforesaid, a one-phase homogeneous system is continuously maintained which contains both reactants and product. It has been found that in order to maintain this highly desirable homogeneous system, the mol ratio of bisulfite to olefin must be kept above about 4:5, preferably above about 6:5 and below about 6:1, and preferably below 3:2. When this ratio is allowed to drop too low, phase separation occurs and the rate of reaction is materially reduced. Furthermore, the problems of mixing and contacting all the reactants in a poly-phase system are greatly increased.

The alkali metal bisulfite may be sodium or potassium bisulfite, preferably sodium bisulfite. The concentration of alkali metal bisulfite solution employed as feed is not critical and is limited only by the solubility of the bisulfite in water. In practice, solutions of alkali metal bisulfite in concentrations from about 1 molar to 6 molar have been found satisfactory.

As indicated above, the bisulfite may be formed in situ by using stoichiometric amounts of the corresponding alkali metal hydroxide and sulfur dioxide. A slight excess of one or the other may be used to adjust the pH as required.

Because of the low solubility in water of the olefins to be sulfonated, a solvent is employed to dissolve the olefins so as to permit a liquid phase reaction. When 2-propanol in the presence of water is used in the present continuous reaction system, the rate of conversion of the olefins is materially increased. The results achieved are surprising. 2-propanol in reactions of the type herein contemplated is regarded as an effective free radical trapping agent, thereby inhibiting the reaction, due to the labile hydrogen attached to the hydroxyl carbon. Therefore, that a high rate of conversion can be achieved, in spite of the use of small amounts of air, is unexpected.

In calculating the water content of the 2-propanol-water solvent medium, total water content of the feed is considered. Thus, for example, any water fed with the alkali metal bisulfite solution is included.

As already indicated, the weight ratio of the 2-propanol to water is in the range 1:4 to 9:4, preferably 1:2 to 2:1.

To obtain maximum conversion rate, it has been found that this ratio is critical; hence, deviation from the limits expressed results in a substantial decrease in conversion rate and/or product yield. Furthermore, too high a ratio of alcohol to water results in gelling and gives a reaction mixture too gelatinous to flow from the reactor.

An overall weight ratio of this solvent mixture to olefin of about 4:1 to about 5:3 has been found satisfactory, a ratio between about 3:1 and 2:1 being preferred. If this ratio is decreased below about 5:3, the reaction mixture solidifies and becomes too thick for efficient mixing. As a result, a rapid decrease in the reaction rate occurs. Similarly, if the solvent to olefin ratio is increased above about 4:1, the reaction rate is rapidly decreased. Furthermore, two liquid phases form, further limiting the rate of reaction.

Any oxygen-containing gas may be employed as the initiator, oxygen being preferred. Economic considerations often dictate the use of air in spite of its slightly lower initiating effect. The oxygen-containing gas used is bubbled directly through the reaction mixture in the reaction zone so as to effect the most efficient contact with the mass of reactants. To give an appreciable initiating effect, it has been found that in the continuous reaction system herein contemplated, a minimum of about 0.01 mol oxygen per mol olefin are employed; amounts considerably in excess of this may be used without undesirably affecting the reaction and may serve to somewhat increase it. About 0.1 to 1.0 mol oxygen per hour per mol olefin provides a satisfactory initiating effect.

Control of pH is important. A pH of between about 5 and 8 is continuously maintained. When the pH falls below about 5, the amount of by-product formation is materially increased. A higher pH up to about 9 tends to substantially decrease the formation of by-product. But at the same time, at a pH beyond about 8 the reaction rate is considerably slowed.

The temperature of reaction is maintained between about 80° and 200° F., preferably 90°–130° F. At temperatures below about 80° F. the reaction rate tends to substantially decrease, and at temperatures above about 200° F. the efficiency of the air initiator is poor. A temperature of about 110° F. is preferred.

Alkali metal sulfonate product can be purified by continuously withdrawing reaction mixture from the reaction zone and passing it into an extraction zone to which a non-aqueous solvent such as n-pentane or n-hexane is also charged in order to extract the unsulfonated olefin. The resulting mixture is then passed to a phase separation zone wherein a phase including the extractant and the unsulfonated olefin is removed and passed to an extractant recovery zone. Therein, the extractant is removed from the olefin by distillation and recycled to the extraction zone. The unsulfonated olefin may be recycled to the reaction zone.

The deoiled, sulfonated product from the phase separation zone is heated to distill off any remaining hydrocarbon extractant and then passed to a desalting zone. Any undesirable salts are removed by admixing the sulfonated olefin with a desalting liquid, such as 1-propanol or 2-propanol. The desalted and deoiled product is separated from the mixture, and the desalting liquid may be recovered and recycled to the desalting zone.

It is also possible to desalt the crude reaction mixture prior to the removal of unsulfonated olefin by passing the crude sulfonated mixture to a cooling zone wherein the crude product is cooled to allow crystallization of the salt; if necessary, seed crystals may be admixed to start the crystalization. The crude reaction mixture is then separated from the salt crystals as by decantation, filtration, or the like and passed to an extraction zone wherein the sulfonated portion is recovered as a deoiled, desalted product and the unsulfonated portion is recovered by means of a nonaqueous solvent, such as n-pentane or n-hexane, as previously described.

As an illustration of the process of the invention, the following examples are presented. In these examples, the product rate, i.e., the gram-mols of product formed per hour per liter of reactor volume, is measured to ascertain the rate of conversion of olefin. Certain reaction variables are individually varied in order to point out the critical limitations described in the invention and expressed in the claims. However, it must be understood that the particular limitations expressed in each specific example are not to be construed as further limitations on the scope of the invention as claimed.

*Example 1*

An olefin mixture of substantially primary olefins within the $C_{10}$–$C_{20}$ range obtained from the cracking of petroleum waxes, 2-propanol alcohol-water solvent, and a 20.4 weight percent sodium hydroxide solution were each continuously added to a continuous-flow, stirred tank reactor. The temperature was maintained at about 104° F. The rate of addition of sodium hydroxide was kept such that its mol ratio to olefin charged was maintained at about 1.77:1. Similarly, the weight ratio of alcohol to water in the feed was kept at about 1:1 and the total solvent to olefin weight ratio at about 2.9:1. Air was introduced into the reactor at a rate of about 3.4 mols air (0.7 mol oxygen) per mol olefin, and sulfur dioxide was continuously added to form sodium bisulfite in situ at a rate sufficient to maintain the pH at about 7. The reaction mixture was continuously removed at a rate of about 0.4–0.5 gram-mol of sulfonate product per hour per liter of reactor volume. It was found that in an average residence time of about 2.2 hours, a 91 mol percent olefin conversion was obtained.

When the ratio of alcohol to water was reduced to about 0.21:1, the rate of sulfonate production dropped to about 0.2 gram-mol per hour per liter of reactor volume.

When the weight ratio of alcohol to water was adjusted to about 2.5:1, the rate of sulfonate production was reduced to about 0.25 gram-mol per hour per liter of reactor volume, and the reaction mixture became too gelatinous to flow from the reactor.

These experiments demonstrate the importance of maintaining the alcohol-water weight ratio within the disclosed critical range.

Example 2

The same experiment as in the first paragraph of Example 1 was conducted, except that instead of a solvent-olefin weight ratio of 2.9:1 being used, this ratio was increased to 6.2:1, outside the critical limits disclosed herein. As a result of this modification, the rate of product formation dropped to less than 0.1 gram-mol per hour per liter of reactor volume. Two liquid phases formed in the reactor at this high solvent to olefin ratio.

Similarly, when the solvent-olefin weight ratio was lowered to 1.6:1, just below the critical lower limit of the disclosed range, the rate of product formation dropped to about 0.2 gram-mol per hour per liter of reactor volume and the solution became thick and difficult to handle. This example demonstrates the criticality of the overall solvent-olefin weight ratio.

Example 3

(A) A mixture of 1-olefins having from 10 to 20 carbons per molecule and an average molecular weight of 195 was charged to a continuous flow, stirred tank reactor at a rate of 21.1 parts per hour. At the same time but through separate feed lines, a 15.5 weight percent caustic solution was charged at 47.8 parts per hour and a 2-propanol solvent was charged at 20.3 parts per hour. Air was bubbled through the rapidly stirred mixture at 10 parts per hour. Simultaneously, $SO_2$ was introduced through a separate line at 10.1 parts per hour, a rate sufficient to maintain the pH at 7.2. These quantities of $SO_2$, sodium hydroxide, and olefin are equivalent to a bisulfite/olefin mole ratio of 1.46. The temperature was maintained at 108° F. Under these conditions, the average residence time in the reactor was 2.4 hours, the olefin conversion was 91%, and the sulfonate product was formed at 0.41 gram-mol per hour per liter of reactor volume. In the reaction product, inorganic salt amounting to 9.7 weight percent based on surface active product was isolated.

(B) At an olefin feed rate of 20.7 parts per hour, the rate of caustic addition was increased to 49.2 parts per hour of a 12.5% solution. At the same time, the $SO_2$ addition was reduced to 8.5 parts per hour. This resulted in a pH of 7.1 and a bisulfite/olefin mole ratio of 1.25. The other reaction conditions remained the same as in (A). In this experiment, only 79% of the olefin was converted and the sulfonate product was formed at 0.34 gram-mol per hour per liter. Inorganic salt was isolated from the product in quantities of 13.7 weight percent based on sulfonate surface active material.

(C) A further decrease in the bisulfite/olefin mole ratio to 0.6 caused the rate of reaction to drop to about one-half of the optimum, to about 0.24 gram-mol per hour per liter.

(D) At an olefin fed rate of 20.9 parts per hour, the mole ratio of bisulfite/olefin was adjusted to 1.66 by appropriate rates of feed for the caustic solution (47.3 parts per hour of a 15.3% solution) and the $SO_2$ gas (11.4 parts per hour). The other operating conditions remained essentially the same. In this case, the rate of reaction was 0.43 gram-mol per hour per liter reactor volume at an 88% olefin conversion. However, the inorganic salt concentration in the product was 13.2 weight percent.

At higher bisulfite/olefin ratios, the amount of inorganic salt in the product increased still more.

Example 4

(A) In a manner equivalent to Example 3, the $C_{10}$–$C_{20}$ 1-olefin mixture was charged at a rate of 20.7 parts per hour to a continuously stirred tank reactor maintained at 100° F. At the same time, a 15.5% caustic solution was added at a rate of 48.3 parts per hour, 2-propanol was added at 20.3 parts per hour, and $SO_2$ was bubbled in at 10.0 parts per hour, a rate sufficient to maintain a pH of 7.1. Air was bubbled through a separate inlet line at 10.4 parts per hour. Under these conditions, the olefin conversion was 89% and the rate of sulfonate product formation was 0.39 gram-mol per hour per liter of reactor volume.

(B) Under essentially the same conditions as before but at a $SO_2$ rate of 10.9 parts per hour and a caustic feed rate of 47.5 parts per hour, the pH leveled out at a value of 6.0. In this run, the rate of product formation was 0.46 gram-mol per hour per liter at an olefin conversion of 90%.

(C) Another run was carried out as before but a pH of 7.6 was maintained by charging a 15.5% caustic solution at 48.8 parts per hour and $SO_2$ at 9.6 parts per hour. In this run, the temperature was held at 104° F. Under these conditions, 84% of the olefin was converted and the reaction rate was 0.40 gram-mol per hour per liter.

(D) A run was made at a pH of 8.2, established by charging the olefin at 21.0 parts per hour, the $SO_2$ at 9.0 parts per hour, and the caustic solution at 49.4 parts per hour. Other conditions were held as in the previous runs. In this example, the olefin was only 50% converted and the production rate was 0.24 gram-mol per hour per liter.

Example 5

A bisulfite solution was prepared by dissolving 1517 parts of sodium metabisulfite and 115 parts of sodium hydroxide in 4374 parts of water. This solution was charged to a continuous-flow, stirred tank reactor at 150 parts per hour. Simultaneously, a $C_{15}$–$C_{20}$ 1-olefin mixture having an average molecular weight of 243 was added at 60 parts per hour. 2-propanol was also added at 63 parts per hour. The temperature was maintained at about 120° F. throughout the run. Air was introduced into the reactor at a rate of 33.6 parts per hour. Sodium hydroxide was added at about 1 part per hour to maintain a pH at a value of 6.5. When operating under these conditions, the average residence time was about 3 hours. The product was formed in about 0.3 to 0.4 gram-mol/hr./liter of reactor at an olefin conversion in excess of 85%.

It will be apparent to those skilled in the art that the present invention has certain very important advantages.

As already indicated, air-initiated reactions of the type herein contemplated have long been known. However, such prior art air-initiated reactions have required long reaction times and/or poor conversions. Accordingly, it has been proposed to replace air with inorganic or organic oxidizing agents in order to expedite the reaction and improve yields. Such reaction initiators however are more costly than air, and are productive of side reaction products or contaminants, the presence of which can be undesirable. The use of air is not only economical but in addition, makes possible a cleaner reaction.

We claim:

1. Process for preparing alkali metal sulfonates, which comprises continuously feeding terminal olefins having 10 to 20 carbon atoms, aqueous alkali metal bisulfite, and 2-propanol-water solvent to a reaction zone at such rates as to maintain in the feed a bisulfite to olefin mol ratio above 4:5 and below about 2:1 and a 2-propanol-water solvent to olefin weight ratio between about 4:1 to 5:3, the weight ratio of 2-propanol to water being between about 1:4 to 9:4, passing a free oxygen-containing gas through the reaction mixture, adjusting the pH between about 5 and 8, maintaining a temperature between about 80° F. and 200° F., intimately admixing the reaction mixture to provide a homogeneous reaction system, and continuously withdrawing alkali metal alkyl sulfonate product from the reaction zone.

2. Process according to claim 1, wherein the alkali metal bisulfite is sodium bisulfite, the 2-propanol-water solvent to olefin weight ratio is between about 3:1 to 2:1, the weight ratio of 2-propanol to water is between about 1:2 to 2:1, and the temperature is between about 90° F. and 130° F.

3. A process for preparing alkali metal alkyl sulfonates, which comprises continuously feeding terminal olefins having 10 to 20 carbon atoms, alkali metal hydroxide solution, and 2-propanol-water solvent to a reaction zone, the weight ratio in the feed of 2-propanol to water being between about 1:4 to 9:4 and of the 2-propanol-water solvent to olefin between about 4:1 to 5:3, continuously adding sulfur dioxide to maintain a pH in about the range 5 to 8, and in proportions to form alkali metal bisulfite to olefin above 4:5 and below about 2:1, intimately admixing the reaction mixture to provide a homogeneous system, passing through the reaction mixture a free oxygen-containing gas, maintaining the reaction mixture at a temperature in about the range 80° F. to 200° F., and continuously withdrawing alkali metal alkyl sulfonate product from the reaction zone.

4. Process according to claim 3, wherein the 2-propanol-water solvent to olefin weight ratio is between about 3:1 to 2:1, the weight ratio of 2-propanol to water is between about 1:2 to 2:1, and the temperature is between about 90° F. and 130° F.

5. Process according to claim 4, wherein the alkali metal hydroxide solution is a sodium hydroxide solution.

References Cited by the Examiner

UNITED STATES PATENTS

| | | | |
|---|---|---|---|
| 2,653,970 | 9/1953 | Fessler | 260—513 |
| 2,793,299 | 4/1957 | Blaser et al. | 260—513 |
| 3,084,186 | 4/1963 | Clippinger | 260—513 |

FOREIGN PATENTS 682,207  11/1952  Great Britain.

LORRAINE A. WEINBERGER, *Primary Examiner.*

M. WEBSTER, *Assistant Examiner.*